United States Patent [19]
Campbell et al.

[11] 3,715,416
[45] Feb. 6, 1973

[54] FILTER START-UP IN DRY SPINNING ACRYLONITRILE COPOLYMER

[75] Inventors: Kenneth C. Campbell, Rock Hill, S.C.; Robert R. Rhinehart, Jr., Charlotte, N.C.

[73] Assignee: Celanese Corporation, New York, N.Y.

[22] Filed: June 14, 1971

[21] Appl. No.: 152,939

[52] U.S. Cl. ..................264/39, 210/137, 210/340, 264/169, 264/206, 425/198, 425/225
[51] Int. Cl. ..........................B28b 7/04, D01d 1/10
[58] Field of Search..................264/203-205, 39, 264/85, 176 F, 169, 40, 206; 425/197-199, 225; 210/340, 341, 137

[56] References Cited

UNITED STATES PATENTS

| | | | |
|---|---|---|---|
| 2,166,051 | 7/1939 | Givens | 264/39 |
| 2,330,932 | 10/1943 | Taylor et al. | 264/85 |
| 2,644,195 | 7/1953 | Bennes et al. | 264/39 |
| 3,436,789 | 4/1969 | Hays | 264/39 |
| 3,461,193 | 8/1969 | Gilardi | 264/85 |
| 3,480,706 | 11/1969 | Carpenter et al. | 264/176 F |
| 3,503,096 | 3/1970 | Mariarelli | 264/176 F |

*Primary Examiner*—Jay H. Woo
*Attorney*—Thomas J. Morgan et al.

[57] ABSTRACT

In dry spinning a heated solution of an acrylonitrile polymer in acetonitrile:water after passage through an apparatus comprising at least one filter, the improvement in the process of resuming flow of solution through said filter after interruption which comprises: positioning said filter in the path of flow of said solution from said supply to the spinnerette without establishing communication therebetween, filling said filter with solvent for said polymer, establishing a predetermined superatmospheric pressure-responsive normally closed outlet for solvent in said filter, either prior to or after filling said filter with solvent, heating it approximately to the temperature of said solution during filtration, establishing communication between said supply and said filter whereby the superatmospheric pressure builds up in said filter and bleeding solvent and solution out through said outlet, continuing to bleed solution through said outlet for a period of time sufficient to reestablish equilibrium conditions with said supply, and establishing communication between said filter and said spinnerette, whereby dry spinning is resumed.

9 Claims, 3 Drawing Figures

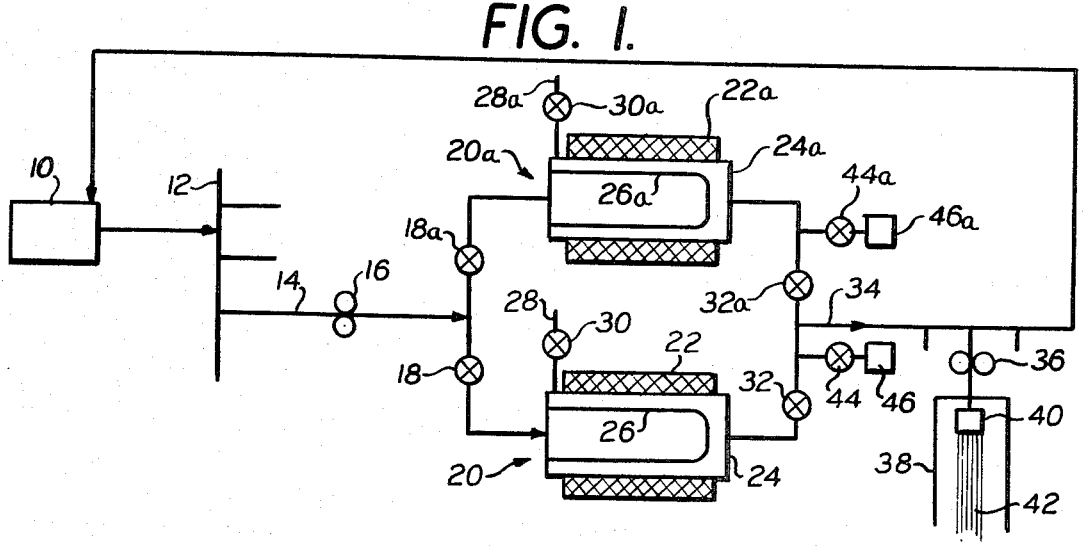

FIG. 1.

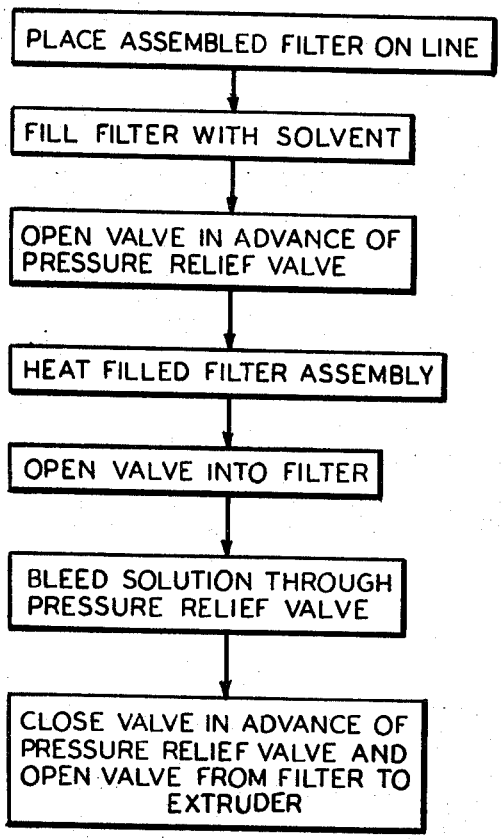

FIG. 2.

- PLACE ASSEMBLED FILTER ON LINE
- FILL FILTER WITH SOLVENT
- OPEN VALVE IN ADVANCE OF PRESSURE RELIEF VALVE
- HEAT FILLED FILTER ASSEMBLY
- OPEN VALVE INTO FILTER
- BLEED SOLUTION THROUGH PRESSURE RELIEF VALVE
- CLOSE VALVE IN ADVANCE OF PRESSURE RELIEF VALVE AND OPEN VALVE FROM FILTER TO EXTRUDER

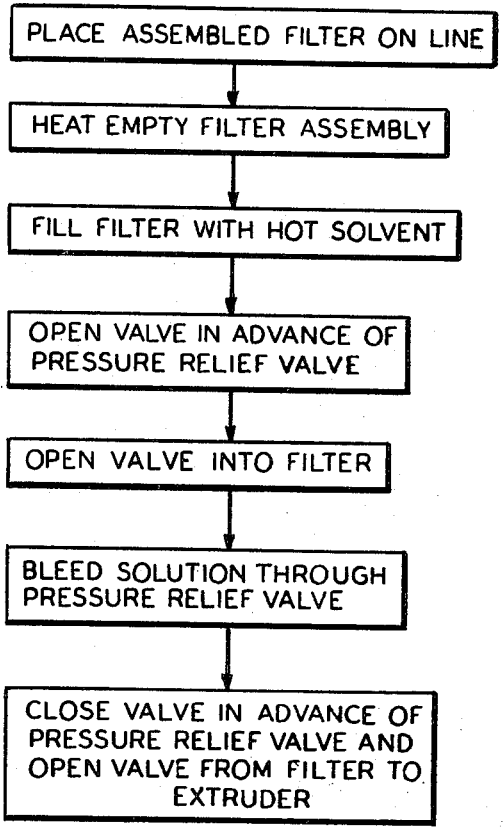

FIG. 3.

- PLACE ASSEMBLED FILTER ON LINE
- HEAT EMPTY FILTER ASSEMBLY
- FILL FILTER WITH HOT SOLVENT
- OPEN VALVE IN ADVANCE OF PRESSURE RELIEF VALVE
- OPEN VALVE INTO FILTER
- BLEED SOLUTION THROUGH PRESSURE RELIEF VALVE
- CLOSE VALVE IN ADVANCE OF PRESSURE RELIEF VALVE AND OPEN VALVE FROM FILTER TO EXTRUDER

INVENTORS
KENNETH C. CAMPBELL
ROBERT R. RHINEHART, JR.

BY

THOMAS J. MORGAN,
HERBERT M. ADRIAN, JR., AND
ANDREW F. SAYKO, JR.

FILTER START-UP IN DRY SPINNING ACRYLONITRILE COPOLYMER

The present invention relates to changing filters in extruding acrylonitrile polymer solutions.

In extruding solutions of polymeric materials to form funicular structures such as fibers and films, the solutions are customarily passed through filters just prior to their extrusion to remove therefrom any particles of solid or semi-solid, i.e. gel, which might clog the extrusion apparatus or interfere with the quality of the extruded structure. This becomes especially critical in dry spinning of filaments, i.e. the extrusion of the solution through a multiplicity of very fine apertures into an evaporative atmosphere, since the apertures are so small and easily clogged and because the products are so small in cross-section that any imperfection may cause a break in the extrudate.

To avoid this problem it is customary to pass the solution through a filter immediately before leaving the extrusion orifice, sometimes referred to as a jet filter. Since such filters, because of their location, may be of limited size and thus of limited capacity, it is also customary to provide an additional filter upstream of said jet filter and downstream of the supply from which said solution is pumped for extrusion. Such additional filter first contacts the solution from the supply and will in time become clogged, in spite of its large capacity. Clogging may proceed to the point where the pressure builds up so great that the filter in question does not get its share of solution, solution going disproportionately to other filters increasing their filtering load, increasing total pressure and the possibility of passing gels. Clogging may also altogether close down the filter.

Accordingly, it is usually customary to monitor the pressure in the filter line and, when it reaches a predetermined level, to divert the flow of solution from said filter to a companion filter arranged in parallel so that solution can continue to flow to the extrusion device. The diversion is effected by suitable valvings and the first filter is cleaned or replaced while the second is in use. Ultimately, of course, the process is reversed when the second filter needs replacement.

The placing of the fresh filter on line has been found to present certain problems. If air is entrapped and forms a bubble, it will present the possibility of a break or discontinuity in the extruded product. It may result in formation of blebs or agglomerates of product at the extrusion device necessitating manual cleaning and loss of extruded product during part of the cycle; since extrusion is a continuous process and the extrusion device is relatively costly it is undesirable to leave the device unproductive.

Difficult as these problems normally are, they are even more pronounced in the extrusion of acrylonitrile polymers from solutions in solvents which are at high temperature and superatmospheric pressure, particularly in the preferred embodiment, where actually gel spinning is taking place under stable superimposed conditions. If the fresh filter is merely placed on line and hot solution is supplied thereto, the solution will cool and form a rubbery gel which will clog the system. If the filter receives solution too rapidly the pressure on the solution, both in the filter and elsewhere in the system wherein other filters are supplied from the common supply, will drop and the hot solvent in the solution will flash into vapor state, leaving behind a foam-like solid plug of polymer which also clogs the apparatus, requiring dismantling and prolonged solvent soaking for cleaning.

In an attempt to avoid these problems, the filter medium of a fresh filter unit, e.g. a fabric or batt of fibrous material, was first soaked in solvent, then placed in the filter unit and heated to vaporize some of the solvent in the hope of creating a pressure which would prevent flashing of the solvent in solution supplied thereto, with attendant formation of solid foam. Unfortunately, this procedure did not prove successful on a consistent basis.

It is accordingly an object of the invention to provide a reliable process for commencing use of a fresh filter in a process for dry spinning a heated solution of an acrylonitrile polymer.

This and other objects and advantages are realized in accordance with the present invention wherein a fresh filter is placed on line and filled with solvent. After filling with solvent, the filter is heated approximately to the temperature of the solution being filtered. The filter unit is provided with a pressure responsive normally closed outlet, i.e. a pressure relief valve. Solution is then supplied to said filter, as by opening a valve and it displaces solvent therein which is forced out said pressure relief valve, followed by movement or bleeding of solution through said valve. Bleeding is continued for several hours to ensure absolute uniformity in the composition of solution within the unit, i.e. no localized residues of the initial solvent, and to ensure freedom from gas bubbles. A valve is then opened from said filter unit to the extrusion device whereupon solution will stop flowing out said pressure relief valve. A valve between the supply and the filter unit which was on stream during the changeover is then closed and that filter unit is available for cleaning and replacement.

The invention will be further described with reference to the accompanying drawing wherein:

FIG. 1 is a schematic illustration of an extrusion system including a pair of parallel filter units;

FIG. 2 is a list of steps followed in placing a fresh filter into use in accordance with one embodiment of the invention; and FIG. 3 is a list of steps followed in accordance with another embodiment of the invention.

Referring now more particularly to the drawing, in FIG. 1 dope or solution of filament-forming polymer is pumped from a supply or reservoir 10 toward a manifold 12, each of whose branches 14 includes a pump 16 which passes dope through an open valve 18 to and through filter unit 20. The filter unit 20 comprises a heating jacket 22 surrounding a wall 24 which defines a chamber in which a filter medium 26 is housed, liquid having to traverse medium 26 in order to leave the unit. An inlet 28, closed off by valve 30, is provided for the purpose later to be described. Dope leaving the unit 20 passes out valve 32 into manifold 34 from which dope passes to extruding devices such as a metering pump 36, a spinning cabinet 38 including an additional filter and spinnerette 40 to form a plurality of filaments 42 upon evaporation of the solvent in the heated atmosphere in the cabinet. The spinning cabinet may include additional structure not shown, conventional in the art, such as piping for gas, heaters, and the like.

The manifold 34 is kept filled with dope to maintain pressure and prevent bubbles of solvent or other gas in the line and to this end dope is usually supplied in excess of the quantity required by pumps 36. Such excess is accordingly recirculated to supply 10.

A closed valve 44 is provided for a purpose later to be described, being arranged in series with a pressure relief valve 46.

In parallel with the filter unit 20 there is arranged a similar assembly comprising closed valve 18a, filter unit 20a, closed valve 32a, etc. Because valves 18a and 32a are closed, no flow of dope takes place through filter unit 20a.

The system functions as follows: as extrusion or spinning proceeds, the filter (not shown) within filter unit 20 becomes clogged. After a problem in the line attributable to the filter, or after the pressure in the filter reaches a predetermined level, or after a predetermined time interval, when it is indicated the filter in unit 20 should be changed, valve 28a is opened, polymer-free solvent (e.g. acetonitrile/water) is supplied to fill idle filter unit 20a and valve 28a is then closed. Valve 44a is opened so that pressure relief valve 46a is now in communication with the interior of filter unit 20a. The filter unit 20a is heated through jacket 22a to raise the temperature of the solvent therein approximately to that of dope used in extrusion. As the temperature rises the pressure builds up and may result in some solvent vapor or even solvent (due to thermal expansion) being vented through relief valve 46a; there is no harm in such venting and whether or not it occurs at this stage is optional, depending upon the valve setting and particular process conditions.

Valve 18a is now opened gradually until fully opened so as not to drain the system instantaneously, and dope begins to flow to filter unit 20a. Since valve 32a is closed the only outlet is through the pressure relief valve and first solvent, and then dope, bleed off through valve 46a; such solvent and dope can be discarded or recycled for reuse, as desired. Such bleeding is continued for at least about 1 hour, advantageously at least about 3 and preferably about 8 hours, to ensure that all solute-free dope has left filter unit 20a, that there are no gas pockets and that the temperature is stabilized. Then valve 44a is closed. Valve 32a is opened and valve 32 can now be closed. Valve 18 is next closed and filter unit 20 is now free to have its filter medium 26 replaced and to be put back in use in the same manner described.

FIG. 2 sets forth in outline the steps just described in placing a fresh filter into use.

In FIG. 3 a similar outline is presented of an alternative sequence using the same apparatus. First the filter unit 20 is placed in position with valves 18, 32 and 44 closed. The empty assembly is heated by heater 22 and hot solvent is admitted at 28 through valve 30 to fill the unit. Valve 30 is closed, relief valve 46 is opened (if not already opened) and valve 44 is opened. Valve 18 is then opened to commence flow of dope to the filter unit and the balance of the steps are the same as in the first embodiment.

The acrylonitrile copolymers to which the invention is addressed contain at least about 85 percent by weight of acrylonitrile although preferably they contain at least about 90 percent by weight of acrylonitrile and up to about 15 percent, preferably 10 percent by weight of another ethylenically unsaturated comonomer. Some or all of the acrylonitrile units may be substituted as with cyano radicals, e.g. cyanoacrylonitrile or vinylidene cyanide, or the like. The comonomer may be any ethylenically unsaturated material such as ethylene, propylene, styrene, or the like, although preferably it is not purely hydrocarbon. Vinylidene chloride is a useful comonomer, imparting flame resistance. Preferred comonomers include ethylenically unsaturated esters of lower alcohols and acids containing an unsaturation in either the alcohol or the acid, i.e. lower alkenyl esters of lower fatty acids or lower alkenoic acid esters of lower alkanols, e.g. methyl methacrylate, ethyl acrylate, methyl crotonate, vinyl acetate, and the like. Such esters are preferably present in about 3 to 10 percent by weight, their presence being known to enhance dyeability of the product. Another especially useful class of comonomers includes ethylenically unsaturated hydrocarbons carrying an amino or sulfonic acid group to impart acid or cationic dyeability, e.g. amino styrene, methallyl sulfonic acid, styrene sulfonic acid, and the like, as described for example in U.S. Pat. Nos. 2,837,500 and 2,837,501. When present such comonomers are utilized in at least about 0.1 percent, advantageously at least about 3 percent by weight of the product. Other techniques for providing dyesites in the molecule, such as by special catalysts in the initial polymerization, will also introduce comonomeric units.

The solvent can be any of those known for such polymers, the most common of which are dimethylformamide and dimethylacetamide. Another suitable solvent is ethylene carbonate. An especially useful solvent has been found to be acetonitrile which may contain up to about 40 percent by weight of water. These solvents can be used for making up the dope as well as for filling up the filter units in initial polymer-free form. Preferably, the same solvent is used for both purposes since then the solvent and dope bled off during start-up can simply be recycled (possibly necessitating minor adjustment in composition) without introducing a foreign component. When used as dope solvent, the concentration of polymer will generally range from about 10 to 45 percent by weight, preferably 20 to 40 percent. To improve the character of the solution the dope is preferably at elevated temperature, e.g. in excess of about 80° C. and preferably from about 100° C. up to about 150° C. Since maintaining dope constitution necessitates pressure, this was the cause of one of the problems which the invention overcomes, the tendency of the heated pressurized solvent to flash off if the pressure drops suddenly. Similarly the necessity of a high temperature may result in unintentional coagulation if the hot dope should locally be cooled as by contacting cold equipment or liquid.

The extrusion is preferably for the purpose of making synthetic filaments for all usual purposes, the filaments ranging in denier from 3 or even 1 or less, up to 50 or more. Alternatively, the extrusion may directly form non-woven structures or films or tapes which may be fibrillated. While extrusion is preferably effected into a hot current of gas such as air to evaporate the solvent and coagulate the polymer into filament-form, for example, coagulation can also be effected by extrusion into a liquid non-solvent (due to temperature or composition) which precipitates or coagulates the polymer in known fashion.

The filter itself may be of any conventional material which will resist degradation from the dope and solvents such as woven fabric, sintered metal or preferably fibrous battings. The process has been described as suitable for maintaining continuity of a filtration process but it can obviously also be utilized for the initial start-up of a filtration process even if only a single filter unit is provided, rather than a pair in parallel. Similarly, in place of a filter unit the novel start-up or changeover technique can be employed on pumps, blenders, and other equipment through which hot dope will be passed in the course of the extrusion.

The invention will be further described in the following illustrative example wherein all parts are by weight unless otherwise expressed.

EXAMPLE

Using an apparatus such as is shown in FIG. 1, filaments are formed by extrusion of a 36 percent solution of about 94.5:5:0.5 copolymer of acrylonitrile:methyl acrylate:Na methallyl sulfonate in 80:20 acetonitrile:water. The temperature of the extruded dope is 120° C. and the equipment is insulated to minimize heat loss and avoid localized cooling. The change in pressure on the dope (pressure drop) across the filter unit is initially about 50 p.s.i.g. and when it reaches 100 p.s.i.g. it is indicated that changeover should be commenced. The filter unit 20a has a fresh filter element 26a. Valve 30a is opened and 80:20 acetonitrile:water at ambient temperature is introduced at 28a to fill the unit. Valve 30a is closed, pressure relief valve 46a is set for a pressure of about 200 p.s.i.g. and is opened, if not already open, and valve 44a is opened. Heating jacket 22a is activated to bring the temperature of the solvent inside unit 20a to 120° G. Valve 18a is opened slowly to maintain a pressure within about ± 20 p.s.i.g., thus minimizing pressure surges in the filter unit 20a. Liquid commences flowing out relief valve 46a and is collected ultimately to be reused; the liquid is initially pure solvent but its composition changes gradually to that of the dope until it is apparently at dope composition, after about 2 hours. Flow is continued through valve 18a and out valve 46a for a total of 8 hours after which valve 32a is opened, valve 44a is closed and 18a is opened fully. Valves 32 and 18 are then closed and filter unit 20, after being drained of its dope and allowed to cool, is now available for replacement of its element 26.

It will be appreciated that the instant specification and example are set forth by way of illustration and not limitation, and that various modifications and changes may be made without departing from the spirit and scope of the present invention.

What is claimed is:

1. In a process wherein a heated solution of an acrylonitrile polymer containing at least about 85 percent by weight of acrylonitrile and up to about 15 percent of another ethylenically unsaturated compound in a volatile organic liquid is extruded from a supply where it is maintained under pressure into an evaporative atmosphere after passage through an apparatus comprising at least one filter wherein solution flow through at least one filter is periodically terminated, and is thereafter resumed, the improvement in the process of resuming flow of solution through said filter which comprises positioning said filter in the path of flow of said solution from said supply to the point of extrusion without establishing communication therebetween, filling said filter with solvent for said polymer, establishing a predetermined superatmospheric pressure-responsive normally closed outlet for solvent in said filter, heating said filter to approximately the temperature of said solution during filtration, establishing communication between said supply and said filter whereby the superatmospheric pressure builds up in said filter and bleeding solvent and solution from said filter through said outlet, continuing to bleed solution through said outlet for a period of time sufficient to reestablish equilibrium conditions with said supply, and establishing communication between said filter and said point of extrusion, whereby solution passes through said filter to said extrusion point into the evaporative atmosphere.

2. The process of claim 1 wherein said solvent comprises acetonitrile, dimethylformamide, dimethylacetamide or ethylene carbonate.

3. The process of claim 1 wherein said solvent comprises aqueous acetonitrile.

4. The process of claim 1 wherein said heating is effected after said piece of apparatus is filled with solvent.

5. The process of claim 1 wherein said heating is effected prior to filling said piece of apparatus with solvent, said solvent also being heated prior to addition to said piece of apparatus.

6. The process of claim 1 wherein said solution of an acrylonitrile copolymer comprises a copolymer of acrylonitrile and methyl acrylate in aqueous acetonitrile.

7. The process of claim 1 wherein said piece of apparatus comprises a plurality of filter units.

8. The process of claim 7 wherein a first filter unit is maintained in use until a predetermined time interval or pressure threshold has been reached, after which a second filter unit is placed in operation while the first unit is still active, the first unit is inactivated, after a predetermined time interval or pressure threshold the second unit is replaced, and the cycle is repeated.

9. The process of claim 8 wherein extrusion is effected to form filaments, the evaporative atmosphere comprises air, said solution comprises a copolymer containing at least about 85 percent by weight of acrylonitrile and up to about 15 percent by weight of methyl acrylate dissolved in aqueous acetonitrile and said solvent comprises aqueous acetonitrile.

* * * * *